Patented July 30, 1946

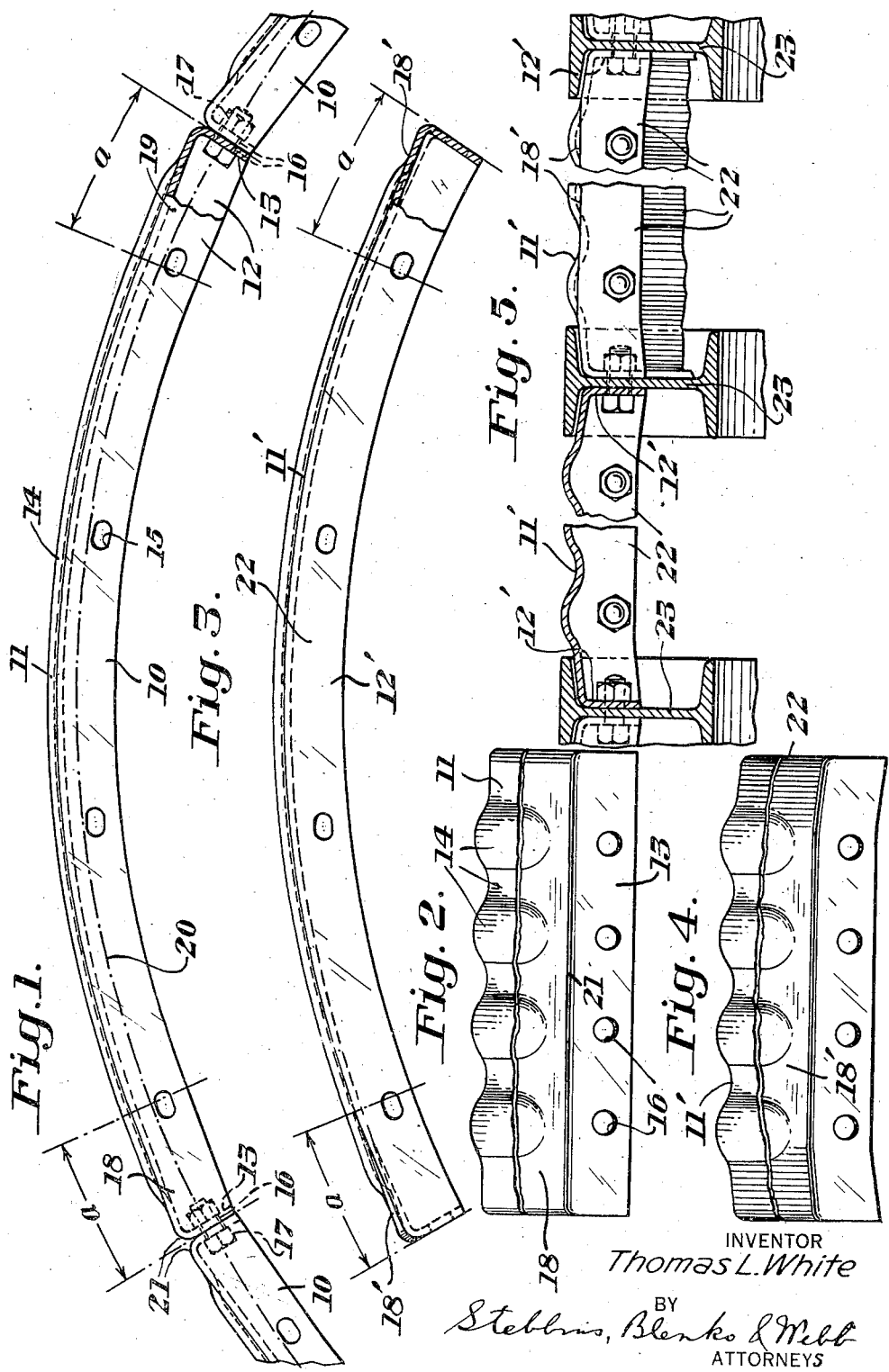

2,404,819

UNITED STATES PATENT OFFICE 2,404,819

TUNNEL LINER SEGMENT

Thomas L. White, Youngstown, Ohio, assignor to The Commercial Shearing & Stamping Company, Youngstown, Ohio, a corporation of Ohio Application July 21, 1945, Serial No. 606,359

6 Claims. (Cl. 61—45)

This invention relates to a segment for the construction of a lining for a tunnel or other similar earth bore.

One form of tunnel lining which has been used extensively comprises a series of rings placed side-by-side coaxially and in abutting relation, each ring being composed of a plurality of segments formed from steel plate and connected end-to-end. The segments usually have side and end flanges whereby the several segments of each ring are connected and the adjacent rings secured together.

The end flanges of liner segments of this type have been formed integral with the body or skin plate by pressing between dies and therefore merge into the skin plate on a curve of definite radius. The stress to which tunnel linings installed in bores through soft ground are subjected is almost entirely circumferential thrust. As a result, the thrust in each ring must be transmitted from one segment to the next through the curved portions connecting the end flanges with the skin plates. Because of this curvature, the end flanges of adjacent segments have abutting contact for only a portion of their depth and the neutral axis of the section taken centrally through a ring of segments normal to its axis passes through the curved portions connecting the end flanges and skin plates of abutting segments. Thus the circumferential thrust is resisted only by the bending movement in the end flanges of abutting segments which develops as a reaction and this tends to cause the segments to bend inwardly at the joint between their abutting end flanges. This tendency obviously constitutes a serious potential weakness in the lining structure.

I have invented a novel form of liner segment which overcomes the aforementioned weakness and makes possible a joint between the ends of abutting segments which tends to bend outwardly under circumferential thrust, any actual outward deformation being resisted by the pressure of the earth adjacent the bore. Bending stress in the end flanges of the segments is thus eliminated. In a preferred embodiment, I provide a liner segment having its end portions displaced outwardly of the general curve of the body portion thereof. This brings the neutral axis intermediate the inner edges of the end flanges and the point at which the flanges are tangent to the curve joining them to the skin plate, and substantially in line with the bolts connecting the abutting end flanges.

Further details of the novel features and advantages of my invention will be explained hereinafter by reference to the accompanying drawing illustrating a preferred embodiment and a modification. In the drawing, Figure 1 is a partial side elevation of a liner ring composed of my improved segments, a portion of one end of one segment being shown in section;

Figure 2 is an end elevation of the segment such as would be seen if both ends rested on a horizontal plane;

Figure 3 is a side elevation, partly in section, showing a modified form of segment;

Figure 4 is an end view thereof; and

Figure 5 is a partial longitudinal section through a lining composed of segments of the modified form having reinforcing I-beam ribs between adjacent rings of segments.

Referring in detail to the drawing and, for the present, to Figures 1 and 2, a liner segment 10 comprises a body or skin plate 11 having side flanges 12 and end flanges 13. The skin plate is curved longitudinally to the desired radius, for the greater portion of its length. The flanges, of course, extend inwardly of the skin plate. Longitudinal corrugations 14 are formed in the latter to stiffen it. Bolt holes 15 are formed in the side flanges to permit adjacent rings of segments to be secured together. Bolt holes 16 in the end flanges permit the segments of a single ring to be secured together by bolts 17.

The end portions 18 and 19 of the segment do not follow the curvature of the intermediate portion but are straight and tangent thereto. The straight portions extend from the ends of the segments only to about the first bolt hole 15, the angle subtended by the straight portions being indicated at a.

It will be apparent from Figure 1 that the outward displacement of the ends of the segments causes the neutral axis indicated by the arc 20 to pass through the end flanges 13 at a considerable distance inwardly of the commencement of the curved portions 21 between the end flanges and the skin plate. In fact, the neutral axis passes substantially through the connecting bolts 17. As a result, the reaction to circumferential thrust tends to cause the joint to deform outwardly in a tunnel through soft earth. However, any outward deformation of the lining is prevented by soil pressure. The portions 18 and 19 need not be straight but could be curved on a larger radius than the intermediate portion of the segment.

In the segment shown in Figures 1 and 2, the side flanges at the ends of the segments follow the shape of the skin plate, i. e., they are straight and tangent to the intermediate portions of the flanges. In a modified form of segment 22 shown in Figures 3 through 5, the side flanges 12' have their inner edges curved to a fixed radius. The end portions 18' are displaced outwardly of the curvature of the intermediate portion of the skin plate but only in the portion of the width of the segment spaced from the side flanges. That is to say, the side flanges have a uniform depth and curvature throughout, the skin plate 11' being flattened at the ends of the segment in the portions spaced from the side flanges. This difference from the segment shown in Figures 1 and 2 involves merely a change in the shape of the dies employed for forming the segments from flat stock.

The modified form of segment is particularly suited, as shown in Figure 5, for use with reinforcing I-beam ribs 23 installed between adjacent rings of segments. These ribs are bent to a uniform curvature. Segments such as that of Figure 3, having their side flanges and side margins uniformly curved, are adapted to fit snugly under the flanges of the ribs as shown, leaving those portions of the ends of the skin plate remote from the side flanges displaced outwardly of the general curvature of the skin plate. The modified form of segment may, however, be used for assembling rings disposed in side-by-side abutting engagement, without reinforcing ribs therebetween.

It will be apparent from the foregoing that my invention provides a segment making possible the construction of tunnel linings considerably stronger than those made from segments known heretofore. The reversal of the direction of deflection at the joints from inward to outward, as a result of the normal loading of the lining, means that the circumferential thrust is transferred from one segment to the other by direct bearing over an extended area. Since the joints do not deflect outwardly because of the pressure of the earth surrounding the lining, the end flanges of the segments are relieved from bending stress. As a result, a lining composed of the segments of my invention may safely carry a greater load than a lining constructed of previously known segments. The segment of my invention may be made in the same manner as previously known segments, merely by properly designing the shaping dies, without increasing the manufacturing cost. The manner of installation is also the same as followed heretofore so that no increase in construction cost is involved. Since the outwardly displaced end portions of the segment extend longitudinally from the end flanges only to the first bolt hole in the side flanges, the connection of the rings side-by-side is permitted with their joints in their usual staggered relation.

Although I have illustrated and described but a preferred embodiment and a modification of my invention, it will be recognized that changes in the details thereof may be made without departing from the spirit of the invention or the scope of the appended claims.

I claim:

1. A liner segment comprising a generally rectangular plate curved longitudinally throughout the greater portion of its length and having inwardly extending side and end flanges, the portions of the plate adjacent the ends being offset outwardly from the extended curve of the intermediate portion and being substantially tangent thereto.

2. A liner segment comprising a generally rectangular plate curved longitudinally throughout the greater portion of its length and having inwardly extending side and end flanges and longitudinally extending corrugations, the portions of the plate adjacent the end being substantially plane except for said corrugations, and tangent to the intermediate portion thereof.

3. A liner segment comprising a generally rectangular plate curved longitudinally throughout the greater portion of its length and having inwardly extending side and end flanges, the portions of the plate adjacent the ends and spaced inwardly from the side margins thereof being displaced outwardly from the extended curve of the intermediate portion.

4. The apparatus defined by claim 1 characterized by said side flanges being straight in the portions thereof adjacent said offset end portions.

5. The apparatus defined by claim 3 characterized by said side flanges being curved continuously from end to end of the plate.

6. A liner segment comprising a skin plate curved longitudinally except adjacent its ends, the end portions of the plate being tangent to the intermediate portion, and inwardly extending flanges at the ends of the plate.

THOMAS L. WHITE.